Dec. 14, 1954  J. H. STERNBERGH, SR  2,696,764
WORK SUPPORTING DEVICE
Filed June 30, 1950  3 Sheets-Sheet 1

INVENTOR.
JAMES HERVEY STERNBERGH SR., DECEASED
BY BERKS COUNTY TRUST COMPANY, EXECUTOR

BY J. C. Grier
ATTORNEY.

Dec. 14, 1954  J. H. STERNBERGH, SR  2,696,764
WORK SUPPORTING DEVICE
Filed June 30, 1950  3 Sheets-Sheet 2

INVENTOR.
JAMES HERVEY STERNBERGH, SR., DECEASED
BY BERKS COUNTY TRUST COMPANY, EXECUTOR

BY J. A. Grier
ATTORNEY.

Dec. 14, 1954  J. H. STERNBERGH, SR  2,696,764
WORK SUPPORTING DEVICE
Filed June 30, 1950  3 Sheets-Sheet 3
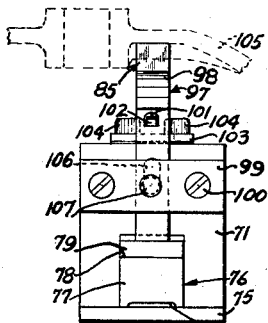
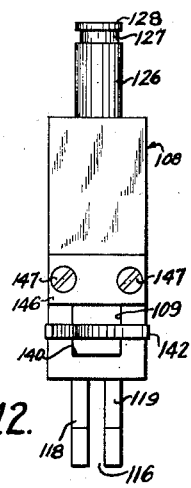
INVENTOR.
JAMES HERVEY STERNBERGH SR., DECEASED
BY BERKS COUNTY TRUST COMPANY, EXECUTOR
BY J. A. Grier
ATTORNEY

United States Patent Office 2,696,764
Patented Dec. 14, 1954

2,696,764

WORK SUPPORTING DEVICE

James Hervey Sternbergh, Sr., deceased, late of Reading, Pa., by Berks County Trust Company, executor, Reading, Pa., assignor to American Die & Tool Company, a corporation of Pennsylvania Application June 30, 1950, Serial No. 171,334

4 Claims. (Cl. 90—59)

This invention relates to improvements in work supports and has for an object the provision of an adjustable irreversible work support or clamp for supporting castings or other bodies, particularly those having irregular shapes, while machining operations are being performed thereon.

Another object of the invention is the provision of a work support which includes a work engaging member freely movable in a direction to contact a piece being worked, yet substantially immobile in the opposite direction.

A further object of the invention is the provision of a work supporting device having a work engaging member freely movable in a direction to contact a piece being worked, but substantially immobile when forces are exerted upon it in an opposite direction by said piece, and means within said device and operable externally thereof for rendering said member movable in both said directions.

Yet another object of the invention is the provision, in a work supporting device, of a work engaging member urged towards the work, a follow up member cooperating therewith and urged in a follow up direction, said first member having an angular surface thereon engaged by an angular surface on said second member, the angularity of said surfaces being such that the reaction of the work against said first member is incapable of moving said first member in a direction away from said work.

Other objects and advantages of the invention will be apparent to those skilled in the art upon a study of this specification and the accompanying drawings.

Referring to the drawings:

Figure 11 is an end elevation of the said device as seen along the lines 11—11 of Figure 8;

Figure 12 is an end elevation of a further modification of the invention;

Figure 13 is an elevation of the same as seen from the right side of Figure 12;

Figure 14 is a plan view of Figure 13 as seen from above;

Figure 15 is a cross-sectional elevation of the device shown in Figures 12 and 13; and Figure 16 is a perspective view of two active elements, of the device of Figures 12 to 15, showing the cooperation of the same.

Referring first to Figures 1 to 6 inclusive, the new and improved irreversible work support includes a base 20 which is generally rectangular in cross-section. The base 20 has, extending therein from the lower surface thereof, an elongated rectangular passage 21. A bottom plate 22 secured under the base in any suitable manner forms a closure therefor.

Figure 5:
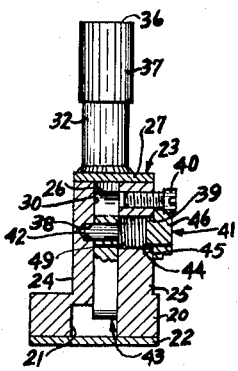
Figure 5 is a sectional elevation taken along the lines 5—5 of Figure 4.

A rectangular housing 23 is formed of metallic blocks 24 and 25 with a space 26 therebetween, bridged by a top plate 27 and end plates 28 and 29. A slot 30 formed in the base 20 has its right edge (as seen in Figure 5) in vertical alignment with the right edge of the passage 21, and the left edge of the block 25 and the right edge of the block 24 are contiguous with the left and the right edges respectively of the slot 30.

The top plate 27 has a hole 31 formed therein, and a tube member 32 has its interior bore in axial alignment with the hole 31. The tube member 32 is secured to the top plate in any suitable manner, for example, by welding. Reciprocally mounted in the interior bore of the tube member 32 is a plunger 33 which has an enlarged head 34 formed on one end thereof. The other end of this plunger has a threaded portion 35 of reduced diameter, thereby providing a shoulder which the lower face of a cap member 36 abuts. The cap member 36 has a threaded hole therein which engages the threaded portion 35 of the plunger. The cap 36 has a depending tubular portion 37, the interior bore of which is preferably slightly larger than the outer diameter of and embraces the tube member 32.

Aligned holes 38 and 39 are formed in the blocks 24 and 25 respectively, the hole 39 being larger in diameter than the hole 38, and spaced apart from the hole 39 is a threaded hole to accommodate a screw 40. A shaft member 41 has a portion 42 which fits the hole 38 and upon which a bell-crank 43 is journaled. A helical spring 44 also embraces the shaft portion 42. The shaft member has a portion 45 which is journaled in the hole 39, and a head portion 46 larger than the portion 45 and shouldering against the outer surface of the block 25. This head portion has an axial hole which accommodates one end of the spring 44, and also it is provided with arcuate depressions 47 to be engaged by the head of the screw 40.

Figure 4:
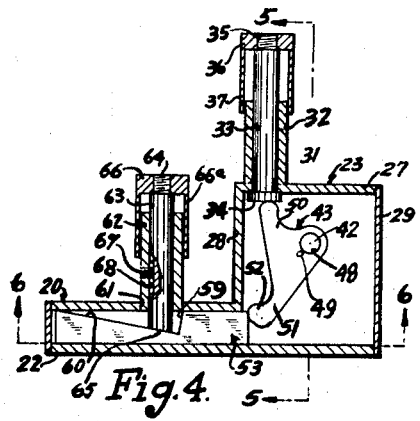
Figure 4 is a sectional elevation taken along the lines 4—4 of Figure 2.

The bell-crank 43 has a hole 48 therein which is journaled on the shaft portion 42 and parallel to this hole is a hole 49 which accommodates the other end of the spring 44 so that the bell-crank is urged in a clockwise direction, as viewed in Figure 4. The bell-crank has an arm 50 the outer end of which is rounded and cams against the head 34 of the plunger 33. The bell-crank has a second arm 51 which extends generally downwardly and carries a cam surface 52 on its lower extremity the purpose of which will be presently described.

Figure 6:
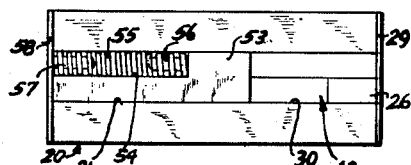
Figure 6 is a view of the device as seen along the lines 6—6 of Figure 4.

Reciprocally mounted in the passage 21 is a horizontal locking member 53 which has a portion cut away to form a cavity 54 to contain a spring 55. Extending into one end of the spring 55 is a pin 57 which is mounted in an end plate 58, secured on the left end of the base 20 as seen in Figures 4 and 6, so that the locking member 53 is constantly urged toward the cam 52 on the bell-crank arm 51.

The upper surface of the locking member 53 has a notch formed therein, the surface 60 of which forms an inclined plane, and which constitutes a camming surface bounded on its lower end by a 90° surface 59.

A hole 61 formed in the upper surface of the base 20, above the inclined plane 60, has coinciding therewith the interior bore of a tubular member 62 which is welded or otherwise secured on the base 20. Journaled in the tubular member 62 is a plunger member 63, the upper end of which has a threaded portion 64 of reduced diameter, and the lower end 65 of which is beveled so that its end surface is parallel to the surface of the inclined plane 60. Threadedly engaging the portion 64 is a cap member 66 having a tubular extension 66a which embraces the tubular portion 62. A set screw 67 is threaded into the tube member 63 and extends through the wall thereof into a vertical slot 68 formed in the plunger member 63, and thus the upper and lower limits of movement of the latter are defined.

To adjust the spring 44 so that it will overcome the action of the spring 55 and also hold the plunger 33 in its uppermost position, the screw 40 may be backed up until its head clears the arcuate depression 47 with which it is engaged. Then the shaft member 41 may be turned in a counter-clockwise direction, as viewed in Figure 3, to increase the tension of the spring 44 against the bell-crank, or in the opposite direction to decrease the tension.

Operation

Figure 1:
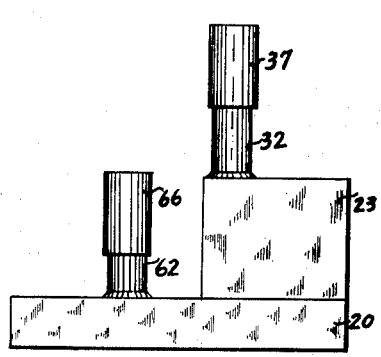
Figure 1 is a side elevation of one form of the new and improved work supports.
Figure 2:
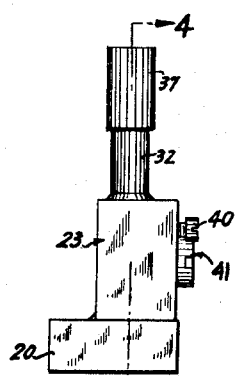
Figure 2 is an elevation as seen from the right end of Figure 1.
Figure 3:
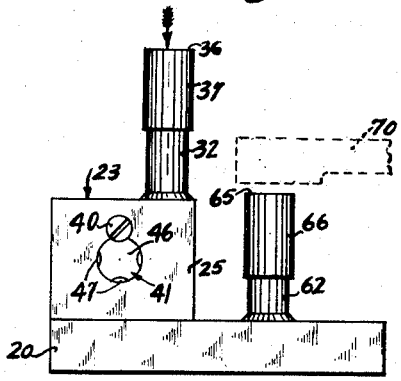
Figure 3 is a side elevation showing the opposite side to that shown in Figure 1.

To steady a projecting portion 70 of a casting, or forging or any similar work piece, supported in a jig, for example, the device is positioned, as shown in Figure 3, for example, with the cap member 65, 66 beneath said projecting portion 70. Then pressure is exerted downwardly upon the cap 36, 37. This pressure may be mechanical or it may be electro-magnetic. If it is mechanical, the pressure may be imposed by a movable element on the drill press for example. If it is electromagnetic it may be imposed by the plunger of a solenoid.

When pressure is exerted on the cap 36, 37, the plunger 33 is moved downwardly bringing the head 34 against the bell-crank arm 50 and moving the bell-crank on its axis. This moves the arm 51 away from the end of the locking member 53. The spring 55 causes the locking member to follow the arm 51. As the locking member follows the arm 51, the inclined plane 60 acting against the end 65 of the plunger 63 moves the latter upwardly until its cap 65 is in contact with the portion 70 of the work piece. Now since the angularity of the inclined plane surface 60 approaches the infinite plane, enormous pressure may be exerted upon the work piece 70 without displacing the cap 66 and its plunger 63, therefore the work piece is just as steady as if a solid block of metal supported it.

One of the important features of the invention is that the plunger 63 moves upwardly very gently until the cap 65 thereon contacts the work piece, and since the inclined plane 60 renders the plunger 63 irreversible, the plunger 63 rigidly supports the work piece, and it cannot move downward unless the plunger 33 is depressed and the downward thrust of the work 70 on the plunger 63 is reduced to a point where the follow-up member 53, under the urge of the spring 55, can move in a non-follow-up direction against whatever friction is present, thereby freeing the plunger 63 to drop due to the force of gravity.

Referring now to Figures 7 to 10 inclusive, a modified form of my new and improved irreversible work support is shown. This device includes a body 71 which has an elongated slot 72 formed therein. This slot extends upwardly from the lower surface thereof and is longitudinally disposed in the body 71. The body has vertical mounting holes 73 and 74 formed therein. These holes extend through a base plate 75 which is secured on the bottom of the body 71 which forms a closure for the elongated slot 72.

Figure 9:
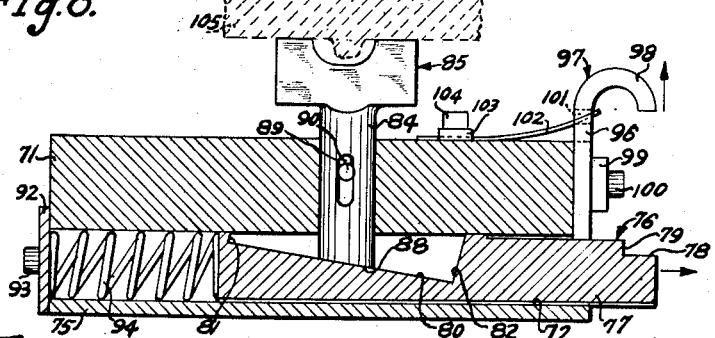
Figure 9 is a longitudinal cross-sectional view of the device shown in Figure 8, showing the positions of the movable elements therein when the work engaging element is in engagement with the work.

Reciprocally mounted in the passage 72 is my new and improved irreversible locking member 76 which consists of an elongated rectangular body 77 having a notch 78 extending inwardly from the right end thereof, as seen in Figure 9, to provide a shoulder 79, the purpose of which will be presently described. The body 77 has an angular surface 80 formed therein which is bounded on one end by a surface 81 and on the other end by a surface 82, both of said surfaces being 90° with respect to the surface 80.

The body 71 has a vertical hole 83 formed therein, and reciprocally mounted in the hole 83 is a shaft 84 which forms the shank portion of a work-engaging member 85. The member 85 includes a head portion 86 which is preferably formed integral with the shaft portion 84, and which may have a clearance passage 87 formed therein to clear ribs or the like on the work. The lower end of the shaft 84 has an angular surface 88 which is substantially the same angle as the surface 80 and, consequently, is in contact with the latter.

In order to prevent the work-engaging member 85 from rotating, a longitudinal slot 89 is formed in the shaft portion 84, and this slot is engaged by the point or straight shank 90 of a screw member 91 which is threaded into the body 71.

The left end of the passage 72, as seen in Figure 9, is spanned by a plate member 92 and secured to the body 71 by means of screws 93.

Between the inner surface of the plate 92 and the left end of the reciprocal body 77 is mounted a helical spring 94 which constantly urges the reciprocal body 77 to the right, as seen in any of the Figures 7 to 10 inclusive.

Figure 7:
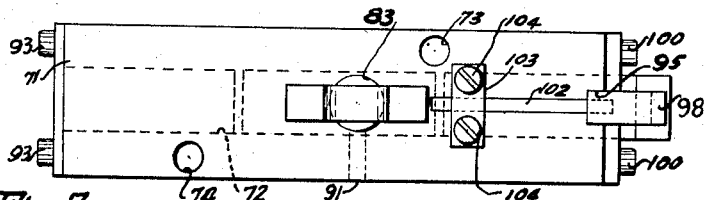
Figure 7 is a plan view of a modified form of the new and improved irreversible work support.
Figure 10:
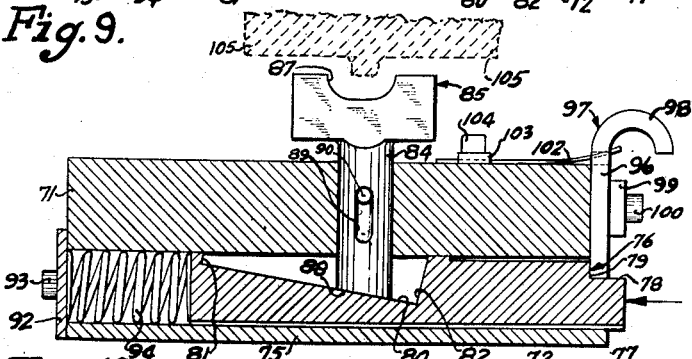
Figure 10 is a sectional view similar to Figure 9 showing the work engaging element disengaged from the work, and the other movable elements "cocked" and ready to be released during a set up for a subsequent operation on another piece of work.

The body 71 has a vertical slot 95 formed therein, and reciprocally carried in this slot is the straight shank portion 96 of a latch member 97. The latch member has a curved portion 98 which is preferably formed integral with the portion 96. To retain the shank portion 96 in the slot 95 a plate 99 extending horizontally across the right end of the body 71 is provided, and this plate is secured to the body 71 by means of screws 100. The latch member 97 has a hole 101 extending therethrough, and extending through this hole is one end of a spring member 102 which is secured to the body 71 by means of a plate member 103 and screws 104. In Figure 7 it will be noted that the plate member 103 spans the spring member 102, and the screws 104 threadedly engage the body member 71 on each side of the spring. The tension of the spring 102 is just a little more than sufficient to maintain the latch member 97 in its upper or disengaged position, so that when the reciprocal member 76 is pressed inwardly from the right, as shown in Figure 10, thereby compressing the spring 94, the work-engaging member is allowed to move downwardly out of engagement with the work 105. The latch member 97 may be pressed downwardly to be engaged by the shoulder 79.

Now the urge of the spring 94 upon the reciprocal member 76 is more than sufficient to overcome the upward urge imparted to the latch member 97 by the spring 102, and thus the holder remains cocked beneath the work 105.

Assuming that the desired operations on the work 105 have been finished, it is removed from its jig or holder (not shown) and replaced by the next piece of work 105. It is clamped or otherwise secured in the jig or holder so that the overhanging portion is substantially in the position shown in Figure 10, then when the operator is sure it has been properly "set up," he moves the latch member 97 upwardly, disengaging it from the shoulder 79 and allowing the irreversible locking member 76 to move to the right, as shown in Figure 9, under the urge of the spring 94.

As member 76 starts moving to the right, the inclined surface 80, acting against the angular surface 88 on the lower end of the work-engaging member, urges the work-engaging member 85 into engagement with the work 105. Due to the angular relation of the surfaces 80 and 88 with the axes of the members upon which these surfaces are formed, enormous force may be exerted downwardly on the work-engaging member without displacing the same downwardly, yet disengaging the work-engaging member from the work by pushing the irreversible member 76 to the left, as seen in Figure 10, requires only sufficient urge to overcome the urge of spring 94 and the friction between the member 76 and the surfaces in contact therewith.

Figure 8:
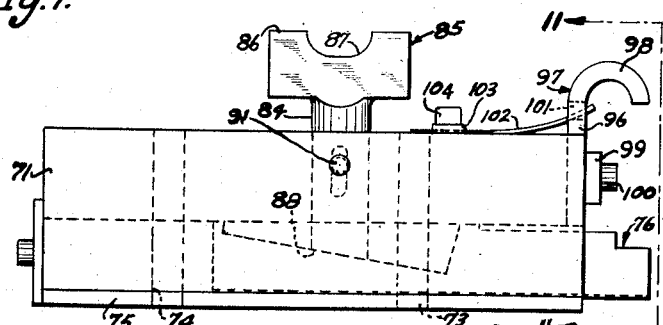
Figure 8 is a side elevation of another modified form of the invention.

Figure 11 shows an end elevation as seen from the right end of Figure 8. In this figure it is seen that a vertical slot 106 is formed in the latch member 97, which is engaged by a screw 107 threaded into the plate 99 and extending into said vertical slot. Thus the vertical slot limits the extreme upward and downward movement of the latch member.

Referring to Figures 12 to 15 inclusive, a further modification of the invention is shown. A body 108 has a horizontal passage 109, and a vertical passage 110 formed therein communicating with each other, both said passages being rectangular in cross-section. The horizontal passage may be, for example, a horizontal slot formed in the body 108 and having its open side covered by a plate member 111, which may be secured to the body by welding, brazing, or by countersunk screws 112. The vertical passage 110 is in fact a slot formed in the body 108 and having one longitudinal side closed by a plate member 113 secured to the body by means of screws 114.

A locking member 115 is generally rectangular and forms a working fit in the passage 110. A slot 116 extends upwardly from the lower end of the member 115 forming a horizontal surface 117 with depending prongs 118 and 119 on either side thereof, and these prongs have beveled surfaces 120 and 121, respectively, formed thereon.

The locking member has an angular surface 122 formed therein, between upwardly extending extensions of the prongs 118 and 119. This angular surface begins at the upper end 123 of the locking member and extends downwardly to the surface 117, thereby forming an inclined plane with which a surface, to be presently described, cooperates to form an irreversible support.

The upper end 123 of the locking member has a threaded hole formed therein which is engaged by a threaded boss 125 formed integral with a shaft 126. The shaft 126 has a groove 127 formed therein near the upper end thereof, leaving a head 128 on said upper end. The groove 127 may be used to connect the shaft 126 with any suitable means for moving it up and down.

The work engaging member 130 may be formed in one piece or it may be formed of several parts or members secured together. It is preferably shown as formed of several members, because making the work-engaging element and its support as a removable unit increases the versatility of the device; for a number of different shaped work-engaging elements may be made up, provided with supports, and used selectively in accordance with the shape of the work.

The member 130 includes a rectangular body 131, having a rectangular extension 132, the upper surface 133 of which is parallel to the lower surface 134 of the body 131, so that the body and its extension 132 form a working fit in the passage 109.

The right end of the body 131, as seen in Figures 15 and 16, is cut away to form angular surfaces, such as the angular surface 135 and 135a (not shown), leaving between them a projecting tongue-like portion 136, having an angular end surface 137 thereon. The surface 137 is parallel to and cooperates with the surface 122 on the locking member 115. The surfaces 135 and 135a are parallel to and cooperate with the surfaces 121 and 120, respectively. These last-mentioned surfaces are provided to increase the limits of motion of member 130 without unduly increasing the movement of the locking member 115. The angles of surfaces 135 and 120 with the vertical should not render the members irreversible, but they can be as great as desired up to their being irreversible in the opposite direction.

The left end of the body 131 has a lateral slot 138 formed thereon. A support element 140 has a tongue 139 extending from the right end, as seen in Figure 16, which forms a snug fit in the slot 138. The left end of the support has a slot 141 formed therein, parallel to the tongue 139 and is provided with aligned holes 144 thereon. Mounted in the slot 141 is a work-engaging element 142 which has holes therein matching the holes 144, and when these holes are aligned with the holes 144, escutcheon pins 143 may be placed in them and riveted, thereby securing the support and the work-engaging element 142 together.

In Figures 13 and 14, the work-engaging element 142 is shown in the form of a plate having two angular surfaces joined by a curved surface, however it will be understood that the work-engaging element may be of many forms as aforesaid herein.

In assembling the work-engaging member 130 (composite) into the body 108, it is positioned in the passage 109, then a spring 145 is positioned with one end against the extension 132, then a plate member 146 is placed in contact with the upper surface of the support 140 and in contact with the outer end of the spring 145 and is pressed in a direction to compress the spring until it, the plate member 146, is in contact with the body 108. Then is it secured to the body by means of screws 147, thereby maintaining the spring 145 under sufficient compression to constantly urge the engaging member into contact with the locking member 115, the contact between the two being the contact of the surface 137 with the surface 122 in the clamped position. In the unclamped or at rest position the surfaces 135, 135a are in contact with the surfaces 121 and 120, respectively.

The device may be used horizontally or vertically. It is suitably secured to or otherwise mounted on a support near the work, and a suitable actuating means is secured to the groove 127 (for example) on the locking member. The work is then supported on its jig or fixture, with the locking means withdrawn to allow the body 131 to retract or move sufficiently to allow the work-engaging member to move to a position clearing the work. After the work is firmly secured in its jig or fixture, the locking member is moved downwardly, the initial movement imparting a rapid motion to member 130 via surfaces 135, 135a, 121, 120, and the final clamping is effected when (as seen in Figure 15) the surface 122 acts against the surface 137 forcing the work-engaging member 130 to the left, and thereby forcing the engaging element 142 into positive and force-resisting engagement with the work.

Although several embodiments of the new irreversible work supports have been shown and described herein, it will be understood that these are for the purpose of illustrating the invention instead of limiting it, as many changes may be made, in the arrangements shown, within the scope of the following claims.

What is claimed is:

1. In a work support, a housing to be supported adjacent to a piece being machined, a work engaging member reciprocably carried in said housing, the end of said member within said housing having its surface beveled, a follow up member within said housing and having a beveled surface substantially parallel to and cooperating with said first mentioned beveled surface, said beveled surfaces forming an acute angle with the longitudinal axis of said follow up member, spring means acting against said following up member for effecting the movement of said work engaging member into a work engaging position, other means under control of an operator for moving said second mentioned member in a direction opposite to said follow up direction to release said first member, and other spring means acting against said other means in said opposite direction, said first spring means being stronger than said second spring means.

2. In a work supporting device, a housing to be supported adjacent to a piece being worked, a work engaging member reciprocally carried in said housing, a follow-up member cooperating with said work engaging member, spring means urging said follow-up member in a follow-up direction, said members having angular flat surfaces thereon substantially parallel to and in engagement with each other and forming an acute angle with the axis of said follow-up member, crank means in said housing in cooperative relation with said follow-up member, plunger means in said housing in engagement with said crank means for urging it out of engagement with said follow-up member, and other spring means urging said crank means into engagement with said follow-up member.

3. A work support according to claim 2 in which said crank means constitutes a bell-crank, one of its arms being in engagement with said follow-up member and the other arm being in engagement with said plunger means, and settable spring means on said housing for imposing a rotary urge upon said bell-crank.

4. In a work supporting device, a housing to be supported adjacent to a piece being worked, a work engaging member reciprocally carried in said housing, a follow-up member cooperating with said work engaging member, spring means urging said follow-up member in a follow-up direction, an angular flat surface on said follow-up member forming an acute angle with the longitudinal axis thereof, an angular surface formed on the inner end of said work engaging member in contact with and substantially parallel to said first angular surface, bell-crank means in said housing, a second spring means acting against said bell-crank means, said bell-crank means having one arm in contact with the end of said follow-up member, and plunger means in said housing in engagement with the other arm of said bell-crank means for moving said first arm away from said follow-up member against the urge of said second spring means, which normally tends to move the bell-crank in a direction to urge the follow-up member in a counter follow-up direction, said second spring being adjustable to overcome the urge of said first spring by any desired degree.

References Cited in the file of this patent

UNITED STATES PATENTS

| Number | Name | Date |
|---|---|---|
| 1,438,250 | Lyon | Dec. 12, 1922 |
| 2,400,314 | Obecny | May 14, 1946 |
| 2,424,090 | Gardiner | July 15, 1947 |